United States Patent

Robinson et al.

Patent Number: 5,828,574
Date of Patent: Oct. 27, 1998

[54] ADAPTIVE FEEDRATES FROM GEOMETRY MODELING FOR NC MACHINING

[75] Inventors: Dean Michael Robinson, Schenectady; Weiping Wang, Niskayuna; Garth M. Nelson, Ballston Lake, all of N.Y.

[73] Assignee: General Electric Company, Schenectady, N.Y.

[21] Appl. No.: 858,852

[22] Filed: May 19, 1997

[51] Int. Cl.$^6$ ............ G06F 15/18; G05B 19/4093
[52] U.S. Cl. ............ 364/474.15; 364/474.17; 364/474.24; 364/474.28; 364/578
[58] Field of Search ............ 364/474.15, 474.17, 364/474.24, 474.28, 578, 474.04, 474.14, 474.22, 468.04; 345/420

[56] References Cited

U.S. PATENT DOCUMENTS

| | | | |
|---|---|---|---|
| 4,833,617 | 5/1989 | Wang | 364/474.15 |
| 5,351,196 | 9/1994 | Sowar et al. | 364/474.24 |
| 5,561,601 | 10/1996 | Inoue et al. | 364/474.24 |
| 5,619,415 | 4/1997 | Seki et al. | 364/474.22 |

OTHER PUBLICATIONS

W.P. Wang et al., "Real–Time Verification of Multiaxis NC Programs With Raster Graphics," Proceedings of the IEEE International Conference on Robotics and Automation, San Francisco, CA, Apr. 7–Oct. 1986, pp. 166–171.

*Primary Examiner*—Reba I. Elmore
*Assistant Examiner*—Steven R. Garland
*Attorney, Agent, or Firm*—Douglas E. Erickson; Marvin Snyder

[57] ABSTRACT

A method for determining an adaptive feedrate for a machine tool used to machine a workpiece initially cut from stock using a stock-cutting program. Initial workpiece geometry is obtained from a geometry modeling program using the stock-cutting NC program as an input. Such automatically-generated initial workpiece geometry is used to derive adjusted (i.e., adaptive) feedrates in accordance with a known method.

2 Claims, 3 Drawing Sheets

ADAPTIVE FEEDRATES FROM GEOMETRY MODELING FOR NC MACHINING

FIELD OF THE INVENTION

The present invention relates generally to NC (numerical control) machining, and more particularly to a method for determining adaptive feedrates for NC machining.

BACKGROUND OF THE INVENTION

NC machines, such as end milling NC machines, are computer-controlled machines which move a machine tool, such as a cutter tool, through a precise sequence of tool motions under the direction of a computer program. In U.S. Pat. No. 4,833,617 a method is disclosed for determining solid-modeling-based (i.e., geometry-modeling-based) adaptive feedrates for NC machines which uses manually-generated inputs for modeling of the original workpiece geometry. It is known to the artisan to perform coordinate system transformations, as required, to convert between a computer program whose tool tip motion is expressed in a machine coordinate system and a computer program whose tool tip motion is expressed in a part (i.e., cutter location) coordinate system. Likewise, it is known to the artisan to perform a conversion, as required, to convert between a computer program which uses feedrates and a computer program which uses inverse-time feedrates.

In applying U.S. Pat. No. 4,833,617, Applicants found that significant inefficiencies and opportunities for human error were caused by the difficulty in precisely modeling the original workpiece brought to the NC machine.

What is needed is an improved method for determining an adaptive feedrate for a machine tool.

SUMMARY OF THE INVENTION

The method of the invention is for determining, by off-line computer simulation of the machining process, an adaptive feedrate for a machine tool wherein the workpiece is initially cut from stock using a stock-cutting program. The method includes generating initial workpiece geometry from a geometry modeling program using the stock-cutting program as an input. The method also includes providing an NC (numerical control) program having coded instructions defining a series of cutting tool motions to follow a tool path and machine the workpiece at a chosen baseline feedrate and cutting speed per instruction. Another step includes using the NC program as an input, continuously modeling in-process workpiece geometry as a solid by subtracting tool swept volume from current workpiece geometry, wherein initial workpiece geometry is obtained from the previous, first-described step. A further step includes calculating for every tool motion a material removal rate, average cutting force, and cutting tool deflection. An additional step includes selecting, based on the modeling and calculating, an adjusted feedrate per tool motion to optimize productivity without violating user set constraints including cutting force and tool deflection.

Several benefits and advantages are derived from the method of the invention. The method automatically generates initial workpiece geometry using the stock-cutting program as an input to the geometry modeling program, thus providing greater efficiency and machining accuracy than methods which use manually-generated inputs to the geometry modeling program to generate initial workpiece geometry.

DETAILED DESCRIPTION OF THE INVENTION

Figure 1:
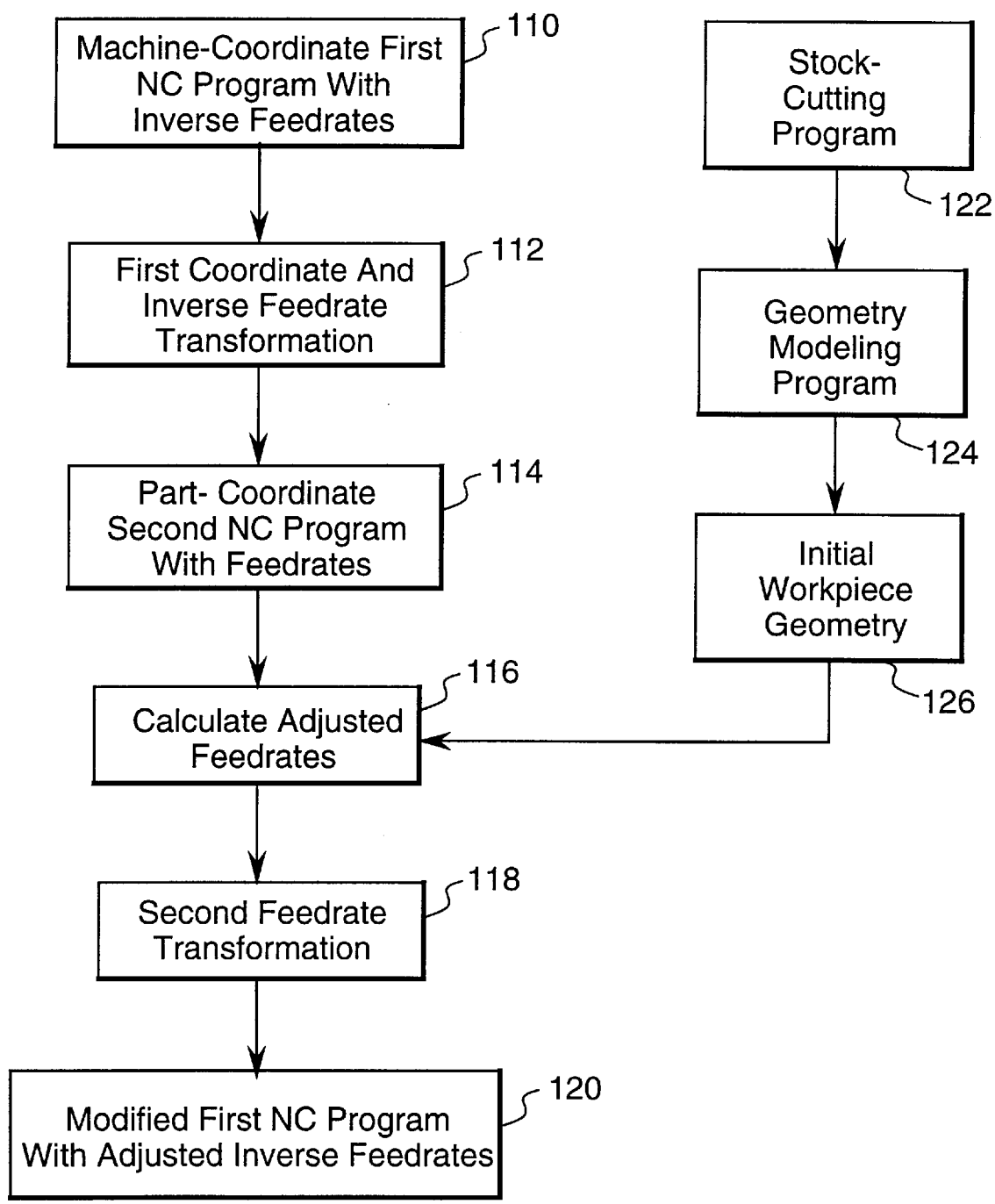
FIG. 1 is a schematic flow diagram of a first preferred method for determining an adaptive feedrate for a machine tool wherein the original NC program is in machine coordinates and inverse-time feedrates.

The first preferred method of the invention includes several steps and begins with step a) portrayed in block 110 of FIG. 1 as "Machine-Coordinate First NC Program With Inverse Feedrates". Step a) includes providing a first NC (numerical control) program having machine-coordinate-system coded instructions expressed in terms including inverse-time feedrate and defining a series of cutting tool motions to follow a tool path and machine a workpiece at a chosen baseline inverse-time feedrate and cutting speed per instruction. Preferably, such first NC program is a commercially available end milling NC program. By "inverse-time feedrate" is meant the reciprocal of the time (e.g., one divided by the number of seconds) commanded for the tool tip to complete a particular tool motion of known translational distance along an axis and/or known angular distance about an axis. Such first NC programs are commercially available for end milling machines.

By "machine coordinate system" is meant a coordinate system which is machine dependent, wherein the coordinate axes are aligned along the machine axes of linear and angular motion. A machine may move the tool linearly along or angularly about one or more machine axes and/or may move the workpiece linearly along or angularly about another or other machine axes. A typical, general-purpose multi-axis milling machine is a "5-axis" machine whose machine coordinate system has three orthogonal axes of translation (i.e., linear distance) (X,Y,Z) and two orthogonal axes of rotation (i.e., angular distance) chosen from the set (A,B,C). By convention, axis "A" denotes angular distance about an axis parallel to "X", axis "B" denotes angular distance about an axis parallel to "Y", and axis "C" denotes angular distance about an axis parallel to "Z". There are many different configurations of conventional NC milling machines. For example, one machine may have the axes (X,Y,Z,A,B) while another has the axes (X,Y,Z,B,C). Other milling machines have only one rotary axis (X,Y,Z,C) and so on. Even among machines with the same axis labels, there are variations. On one machine, for example, rotation of the "A" axis might move the cutter. On another, the "A" axis might be carried on the "B" axis and move the workpiece. It is noted however, that a machine may be designed to have any machine coordinate system and that machine coded instructions may be given in absolute or incremental machine-level coordinates.

The first preferred method also includes step b) portrayed in blocks 112 and 114 of FIG. 1 as "First Coordinate And Inverse Feedrate Transformation" and "Part-Coordinate Second NC Program With Feedrates". Step b) includes performing an inverse-time feedrate inversion and a first coordinate system transformation on the first NC program to obtain a second NC program having part-coordinate-system coded instructions expressed in terms including feedrate. By
}

"feedrate" is meant the speed (e.g., inches-per-second or degrees [or radians] per second) commanded for the tool tip to perform a particular tool motion involving moving the tool tip a linear distance along an axis and/or an angular distance about an axis. An "inverse-time feedrate inversion" multiplies the linear or angular distance of a tool motion by the inverse-time feedrate to yield the feedrate.

By "part coordinate system" (or cutter location coordinate system) is meant a coordinate system which is independent of any NC machine. Tool tip motion described in a part coordinate system moves the tool tip without a thought as to how a particular machine has to actually achieve such motion. A typical part coordinate system describes tool tip linear and angular motion in six axes (x,y,z,i,j,k) wherein x, y, and z are three orthogonal axes of linear motion, and i, j, and k are the direction cosines of the tool's axis of rotation in part coordinates, directed upwards from the tool tip along the axis of the tool. It is noted that i is the direction cosine along the x axis, j is the direction cosine along the y axis, and z is the direction cosine along the z axis.

An example of the first coordinate system transformation is given below wherein in machine coordinates: the tool is carried on the translational axes (X,Y,Z) and not on the rotational axes (A,B); the tool is aligned along the Z translational axis; and the workpiece is carried on the B rotational axis which is carried on the A rotational axis. The part coordinates of the tool tip, which may be derived by the artisan, are given as follows:

$$x = X \cos B - Y \sin A \sin B + (Z-t)\cos A \sin B - s \sin A \sin B + v(\cos A - 1) + d(\cos B - 1) + v \sin B$$

$$y = Y \cos A + (Z-t)\sin A + s(\cos A - 1) + v \sin A$$

$$z = (Z-t)\cos A \cos B - X \sin B - Y \sin A \cos B - s \sin A \cos B + v(\cos A - 1)\cos B - d \sin B + v(\cos B - 1)$$

$$i = \cos A \sin B$$

$$j = \sin A$$

$$k = \cos A \cos B$$

wherein:
"t" is the distance of the tool tip from machine Z zero;
"d" is the X offset distance of the B rotational axis;
"v" is the Z offset distance of the A and B rotational axes; and
"s" is the Y offset distance of the A rotational axis.

The first preferred method moreover includes steps c), d), and e) portrayed in block 116 of FIG. 1 as "Calculate Adjusted Feedrates". Step c) includes using the second NC program as an input, continuously modeling in-process workpiece geometry as a solid by subtracting tool swept volume from current workpiece geometry. Step d) includes calculating for every tool motion a material removal rate, average cutting force, and cutting tool deflection. Step e) includes selecting, based on the modeling and calculating, an adjusted feedrate, per tool motion, to optimize productivity without violating user set constraints on cutting force and tool deflection. The artisan is directed to US Pat. No. 4,833,617 which describes steps c), d), and e) in detail.

It is noted that the adjusted feedrates in block 116 are adaptive feedrates, and that adaptive feedrates save machining time. This is true because commercial NC programming systems require the NC programmer to assign feed rates conservatively, so that the feed rate for a given collection of tool motions is slow enough to accommodate the worst case (e.g., the heaviest cut) in the collection. Adaptive feedrate control allows the tool to move as quickly as possible during each cutting motion.

Preferably, the first preferred method further includes step f) portrayed in blocks 118 and 120 of FIG. 1 as "Second Feedrate Transformation" and "Modified First NC Program With Adjusted Inverse Feedrates". Step f) includes performing a second feedrate inversion to obtain a modified first NC program for input to the machine tool. The second feedrate inversion (i.e., the adjusted inverse feedrate) is calculated by multiplying the inverse-time feedrate in the first NC program by the ratio of the adjusted feedrate to the feedrate in the second NC program, and the adjusted inverse feedrate is used to modify (i.e., update) the first NC program. It is noted that these steps require the simultaneous reading of three files: the adjusted feedrates from step e), the first NC program from step a), and the second NC program from step b) to identify which instruction in machine-level data is matched with a given adaptive feedrate. Because long machine-level programs may have duplicate line numbers (much as a car's odometer "wraps around" to zero at a certain point) additional logic is needed to make the correct matches, such additional logic being within the level of skill of the artisan.

The first preferred method desirably includes decreasing the adjusted inverse-time feedrate of the modified first NC program for a particular machine motion so as not to violate user set constraints on machine motion. Examples of user set constraints on machine motion include user set limits on the maximum velocities of the linear and/or angular axes of the machine tool.

It is further desired that the first preferred method include decreasing the adjusted inverse-time feedrate of the modified first NC program for a current machine motion if the adjusted inverse-time feedrate for the next machine motion is less than a predetermined fraction of the adjusted inverse-time feedrate for the current machine motion. This avoids having to rapidly decelerate linear and/or angular machine-tool motion between two consecutive tool motions, thus avoiding possibly overstressing the machine and possibly overshooting a programmed tool tip position leading to decreased machining accuracy.

Preferably, the workpiece is initially cut from stock using a stock-cutting program such as a wire-EDM (electro-discharge-machining) numerical-control (NC) cutting program. In an exemplary implementation, the first preferred method includes a step portrayed in blocks 122, 124, and 126 of FIG. 1 as "Stock Cutting Program", "Geometry Modeling Program", and "Initial Workpiece Geometry". This step includes generating initial workpiece geometry from a geometry modeling program using the stock-cutting program as an input. Preferably, the geometry modeling program uses a commercially-available (or other) geometry modeling program with pre-processing to convert tool motions in the stock-cutting program into input for the geometry modeling program, as is within the skill level of the artisan. This provides an automatic and more accurate definition of the initial workpiece geometry. Automatic definition of the initial workpiece geometry provides significant advantages. Without this automatic definition, a user typically creates a "conservative" model of the workpiece geometry which is usually a rectangular block which completely encloses the initial workpiece. A rectangular block typically is a poor approximation of the initial workpiece geometry. When this conservative workpiece model is used to calculate adaptive feedrates, the computed feedrates are much slower than necessary as the tool enters and leaves the stock. This is because the machining simulation calculates feedrates appropriate for removing metal when, in fact, the tool is still "in air" and a rapid feedrate could be used. Automatic modeling of the exact workpiece geometry allows the tool to move at a rapid feedrate whenever the tool is not in contact with the workpiece. In addition, automatic creation of the workpiece geometry frees the user from the manual effort and potential errors involved in creating a conservative model of the initial workpiece geometry. It is noted that the initial workpiece geometry is an input to block 116 of FIG. 1.

Figure 2:
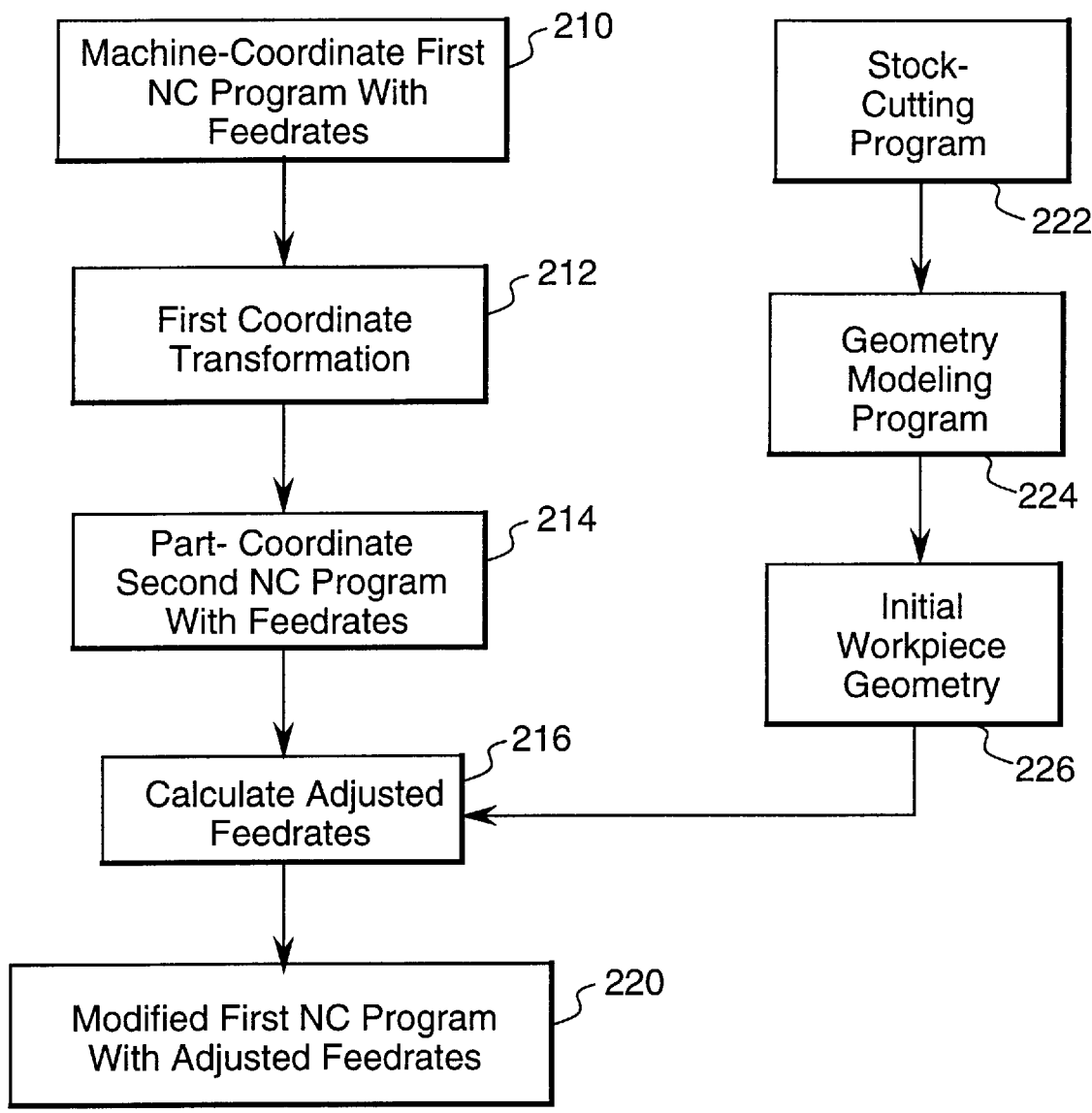
FIG. 2 is a schematic flow diagram of a second preferred method wherein the original NC program is in machine coordinates and feedrates.

A second preferred embodiment of the method of the invention is shown in generalized block diagram form in FIG. 2. The blocks are numbered in "200 series". Each 200-series block (and associated step or steps) in FIG. 2 is identical to the previously-discussed, corresponding 100-series block (and associated step or steps) in FIG. 1 with the exceptions that: in block 210 of FIG. 2 the first NC program has machine instructions (i.e., machine-coordinate-system coded instructions) expressed in terms including feedrate instead of inverse feedrate (i.e., inverse-time feedrate) as in block 110 of FIG. 1; in block 212 of FIG. 2 the inverse feedrate transformation (i.e., inversion) of block 112 of FIG. 1 has been eliminated; and in block 220 of FIG. 2 the modified first NC program has adjusted feedrates instead of adjusted inverse-time feedrates of block 120 of FIG. 1. With those modifications, steps a) through e) of the second preferred method are otherwise identical to steps a) through e) of the first preferred method. Step f) modifies the first NC program with the adjusted feedrate obtained from step e). It can be appreciated by those skilled in the art that the second preferred method is a desirable method when the original machine instructions are given in terms including feedrates instead of inverse-time feedrates.

Figure 3:
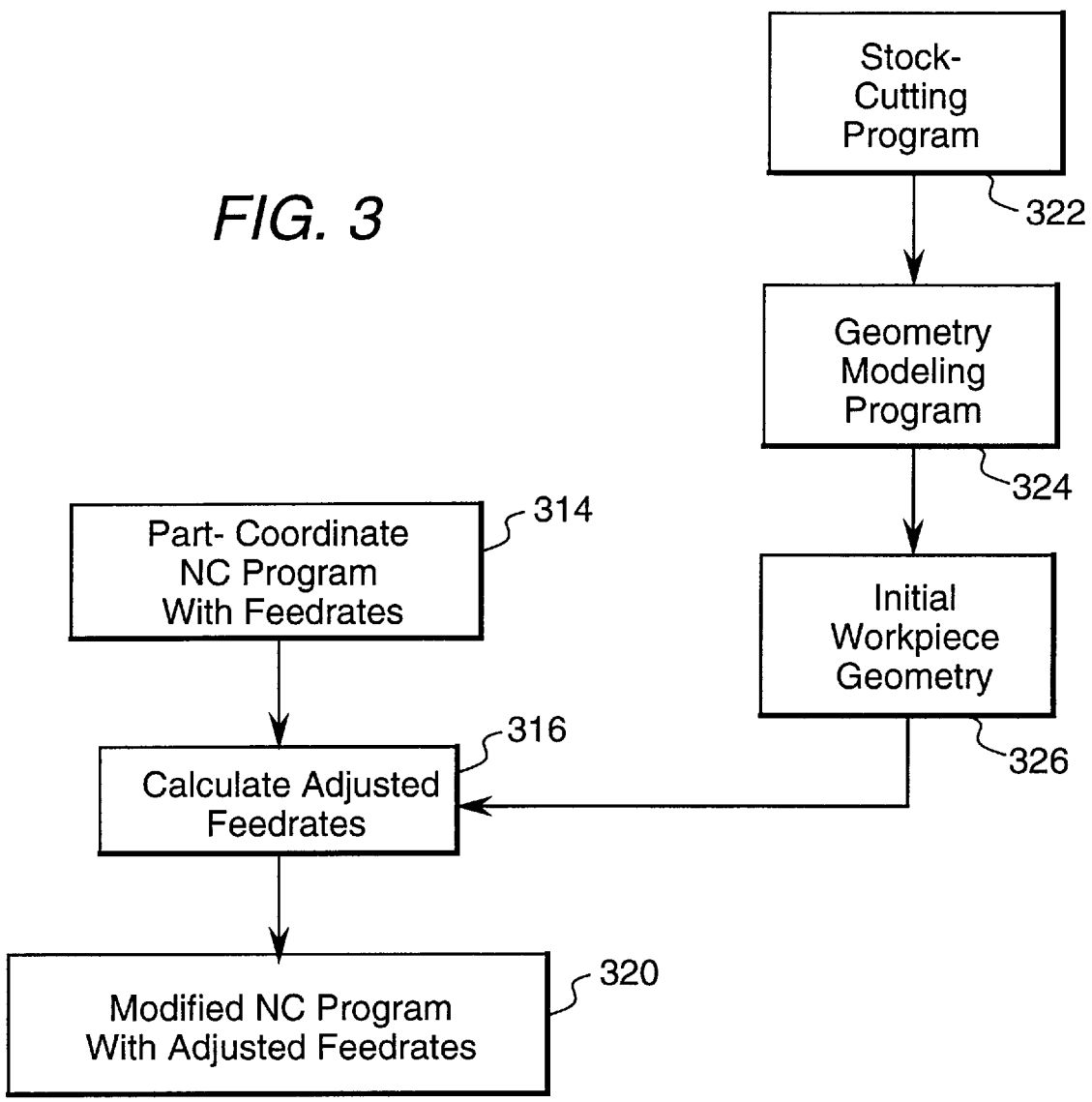
FIG. 3 is a schematic flow diagram of a third preferred method, wherein (as in FIGS. 1 and 2) the initial workpiece geometry is automatically obtained from a geometry modeling program using a stock-cutting program as an input, and wherein the original NC program is in part coordinates and feedrates.

A third preferred embodiment of the method of the invention is shown in generalized block diagram form in FIG. 3. The third preferred method is for determining, by off-line computer simulation of the machining process, an adaptive feedrate for a machine tool used to machine a workpiece initially cut from stock using a stock-cutting program. The blocks are numbered in "300 series". Each 300-series block in FIG. 3 is identical to the previously-discussed, corresponding 100-series block in FIG. 1 with the exceptions that: the terminology "NC Program" is used in block 314 of FIG. 3 instead of the terminology "Second NC Program" used in block 114 of FIG. 1; and the terminology "Modified NC Program With Adjusted Feedrates" is used in block 320 of FIG. 3 instead of the terminology "Modified First NC Program With Adjusted Inverse Feedrates" used in block 120 of FIG. 2.

The basic steps of the third preferred method are denoted as step a) through step e). Step a) includes generating initial workpiece geometry from a geometry modeling program using the stock-cutting program as an input. Step a) of the third preferred method is illustrated by blocks 322, 324, and 326 of FIG. 3 and is identical to the discussion of the step in the first preferred method corresponding to the previous discussion associated with blocks 122, 124, and 126 of FIG. 1. Step b) includes providing an NC (numerical control) program having coded instructions defining a series of cutting tool motions to follow a tool path and machine the workpiece at a chosen baseline feedrate and cutting speed per instruction. Step b) of the third preferred method is illustrated by block 314 of FIG. 3. Steps c), d) and e) of the third preferred method are illustrated by block 316 of FIG. 3 and are identical to steps c), d), and e) of the first preferred method illustrated by block 116 of FIG. 1. It is noted that the adjusted feedrates in block 316 are adaptive feedrates. An additional preferred step f) of the third preferred method is illustrated in block 320 of FIG. 3. Step f) modifies the first NC program with the adjusted feedrate obtained from step e). As previously mentioned, preferably, the workpiece is initially cut from stock using a stock-cutting program which is a wire-EDM (electro-discharge-machining) numerical-control (NC) cutting program.

The foregoing description of several preferred methods of the invention has been presented for purposes of illustration. It is not intended to be exhaustive or to limit the invention to the precise methods disclosed, and obviously many modifications and variations are possible in light of the above teaching. It is intended that the scope of the invention be defined by the claims appended hereto.

We claim:

1. A method for determining, by off-line computer simulation of the machining process, an adaptive feedrate for a machine tool used to machine a workpiece initially cut from stock using a stock-cutting program, comprising the steps of:

a) generating initial workpiece geometry from a geometry modeling program using said stock-cutting program as an input;

b) providing an NC (numerical control) program having coded instructions defining a series of cutting tool motions to follow a tool path and machine said workpiece at a chosen baseline feedrate and cutting speed per instruction;

c) using said NC program as an input, continuously modeling in-process workpiece geometry as a solid by subtracting tool swept volume from current workpiece geometry, wherein initial workpiece geometry is obtained from step a);

d) calculating for every tool motion a material removal rate, average cutting force, and cutting tool deflection; and e) selecting, based on said modeling and calculating, an adjusted feedrate per tool motion to optimize productivity without violating user set constraints including cutting force and tool deflection.

2. The method of claim 1, wherein said stock-cutting program is a wire-EDM (electro-discharge-machining) numerical-control cutting program.

* * * * *